April 28, 1964 R. J. FARBER 3,131,356

NONLINEAR AMPLIFIER FOR PROVIDING OUTPUT WHICH VARIES EXPONENTIALLY AS A FUNCTION OF INPUT SIGNAL

Filed Jan. 4, 1961

United States Patent Office 3,131,356

Patented Apr. 28, 1964

3,131,356

NONLINEAR AMPLIFIER FOR PROVIDING OUTPUT WHICH VARIES EXPONENTIALLY AS A FUNCTION OF INPUT SIGNAL

Richard J. Farber, New Hyde Park, N.Y., assignor to Hazeltine Research, Inc., a corporation of Illinois Filed Jan. 4, 1961, Ser. No. 80,696

7 Claims. (Cl. 328—145)

Figure 1:
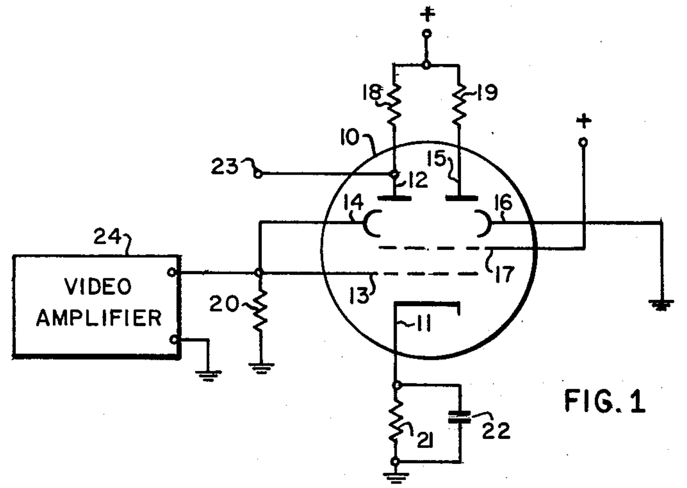

This invention relates to a nonlinear amplifier. Such an amplifier has a particular application as a logarithmic or exponential amplifier in an analog computer.

This application is a continuation-in-part of application Serial No. 859,903, filed December 16, 1959, now abandoned, entitled "Nonlinear Amplifier."

It is an object of the present invention to provide a new and improved nonlinear amplifier of simplified construction.

In accordance with a particular form of the present invention a nonlinear amplifier comprises a current-conductive device composed of at least a cathode, an anode, a control electrode and a pair of deflection electrodes, for nonlinearly amplifying an input signal when the input signal is coupled jointly to the control electrode and a given one of the deflection electrodes, the remaining deflection electrode being directly coupled to a source of fixed potential. The nonlinear amplifier additionally includes means, jointly coupled to the control electrode and the given deflection electrode, for supplying a single source of input signals to be nonlinearly amplified.

For a better understanding of the present invention, together with other and further objects thereof, reference is had to the following description taken in connection with the accompanying drawing, and its scope will be pointed out in the appended claims.

Figure 2:
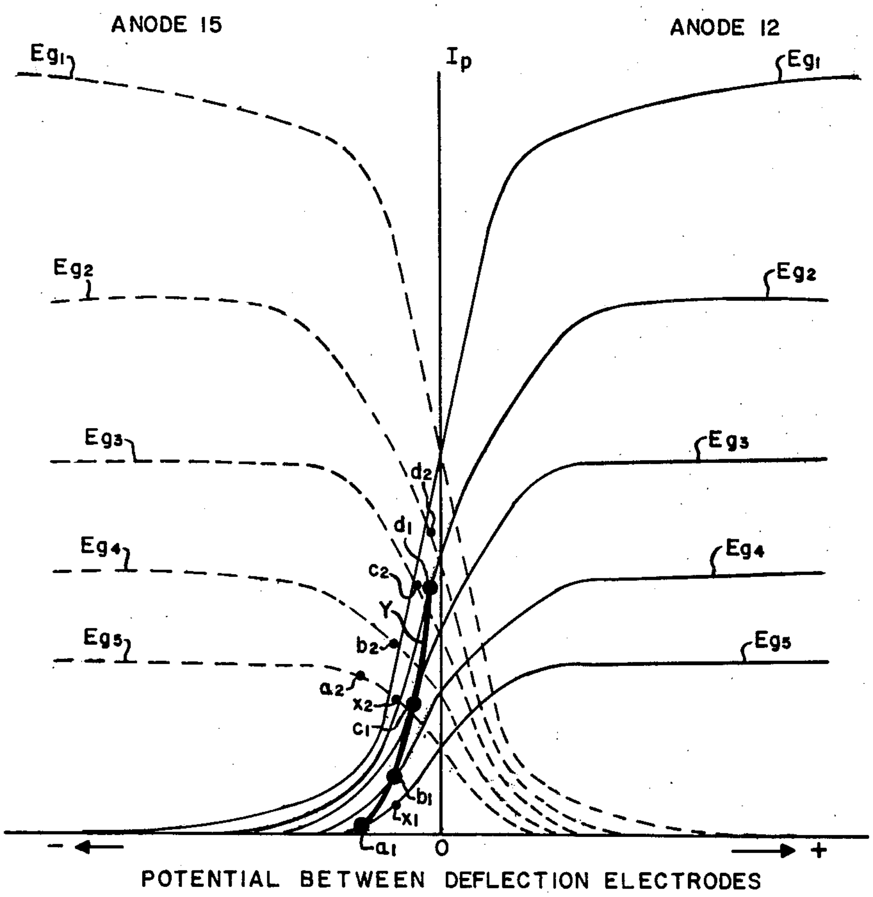

Referring to the drawing:

FIG. 1 shows a nonlinear amplifier constructed in accordance with the present invention, and FIG. 2 shows curves representing the tube characteristics of 6AR8 beam deflection tube which may be used in the present invention.

*Description of Nonlinear Amplifier*

Referring to FIG. 1, a nonlinear amplifier constructed in accordance with the present invention includes the current-conductive device 10 composed of a cathode 11, an anode 12, a control electrode 13, and a deflection electrode 14. More particularly, the current-conductive device 10 may be a 6AR8 beam deflection tube which includes, in addition to the above-mentioned elements, a second anode 15, a second deflection electrode 16, and a screen electrode 17. The anodes 12 and 15 may be coupled to a source of positive potential through a pair of resistors 18 and 19, respectively, and the screen electrode 17 may be connected directly to a source of positive potential. The control electrode 13 and the deflection electrode 14 may be coupled to ground through a grid resistor 20 and the cathode 11 may be coupled to ground through a parallel circuit of a resistor 21 and a capacitor 22. The deflection electrode 16 may be connected directly to a source of fixed potential, such as ground for example. The anode 12 may be connected to an output terminal 23. The nonlinear amplifier also includes means 24, jointly coupled to the control electrode 13 and the deflection electrode 14, for supplying a single source of input signals to be nonlinearly amplified. More particularly, means 24 may be a video amplifier or other similar signal source.

*Operation of Nonlinear Amplifier*

The operation of the nonlinear amplifier of the present invention will be most readily understood if the control electrode 13 is initially disconnected from the video amplifier 24 and is instead connected to a variable D.-C. source. The current-conductive device 10, in particular, a 6AR8 beam deflection tube, has a gain characteristic between the deflection electrode 14 and the anode 12 which varies substantially exponentially as the potential of the control electrode 13 is made less negative. Because of this gain characteristic, when the control electrode 13 is connected to the same input signal source as is the deflection electrode 14, namely the video amplifier 24, the instantaneous value of the current directed to the anode 12 varies in an exponential manner as a function of the instantaneous value of the input signal. In other words, the differential gain of the nonlinear amplifier and more particularly the output signal developed at the anode 12 varies in an exponential manner as a function of the input signal supplied by the video amplifier 24.

FIG. 2 shows curves representing the tube characteristics of a 6AR8 beam deflection tube. The curves indicate the variations in the amount of current directed to the anodes 12 and 15 as a function of the potential applied between the deflection electrodes 14 and 16 and as a function of the potential of the control electrode 13. The letters $E_{g1}$ through $E_{g5}$, inclusive, represent different control electrode potentials which become more negative as the subscript numbers get higher. The solid curves indicate variations in the amount of current directed to anode 12 and the dotted curves indicate variations in the amount of current directed to anode 15.

If the initial instantaneous value of the signal supplied by the video amplifier 24 is assumed to be highly negative, the potential of the control electrode 13 is highly negative and the potential between deflection electrodes 14 and 16 is also highly negative since the video amplifier 24 is directly coupled to the control electrode 13 and the deflection electrode 14. As shown in FIG. 2, the most negative control electrode potential corresponds to $E_{g5}$. If, as assumed, the potential of the control electrode is highly negative, for example equal to $E_{g5}$, the operating points of the beam deflection tube 10 must lie somewhere along the $E_{g5}$ curves. Since the potential between the deflection electrodes 14 and 16 is also highly negative, the operating points must lie on the left-hand portions of the $E_{g5}$ curves. The operating points $a_1$ and $a_2$ satisfy the above requirements in that they lie on the solid and dotted $E_{g5}$ curves and on the left-hand portions thereof. The two operating points $a_1$ and $a_2$, indicate that substantially all the current in the tube 10 is directed to the anode 15. As the instantaneous value of the input signal supplied by means 24 becomes less negative, the potential between the deflection electrodes 14 and 16 also becomes less negative and the operating points in effect tend to move toward the right along the $E_{g5}$ curves to points $x_1$ and $x_2$. This corresponds to a decrease in the amount of current directed to the anode 15 and an increase in the amount of current directed to the anode 12. Since the potential of the control electrode 13 also becomes less negative, the operating points, in addition to moving toward the right, also move toward less negative grid potential curves such as the $E_{g4}$ curves and may be represented by the operating points $b_1$ and $b_2$. As the instantaneous value of the input signal supplied by means 24 continues to become less negative, the operating points tend to continue to move toward the right and continue to move toward less negative grid potential curves. This action may be represented by operating points such as $c_1$, $c_2$, $d_1$, and $d_2$. If the operating points $a_1$, $b_1$, $c_1$, and $d_1$, all lying on dotted curves, are connected as shown by the heavy solid curve Y, the locus of these points describes an exponential curve. Thus, from FIG. 2 it is seen that for a current-conductive device such as a 6AR8 beam deflection tube having a gain characteristic between the deflection electrode and the anode which varies substantially exponentially as the potential of the control electrode is made less negative, the transfer characteristic between the input electrode and the output anode is an exponential curve when both the deflection electrode and the control electrode are connected to the same input signal source.

Under certain conditions it may be desirable to couple only a portion of the signal supplied by the video amplifier 24 to the control electrode 13 while the complete signal is coupled to the deflection electrode 14. In such a case, the resistor 20 may be replaced by a potentiometer and the control electrode 13 may be connected to the wiper arm of such a potentiometer. It is obvious that the reverse may also be done, namely, the coupling of only a portion of the signal supplied by the video amplifier 24 to the deflection electrode 14.

It may also be desirable, under certain conditions, to connect the resistor 20 and the deflection electrode 16 to sources of fixed potential other than ground so as to provide different bias potentials. The effect of bias sources connected to these points is to linearly displace the solid curve Y of FIG. 2 either to the right or to the left depending upon the value of the bias voltages.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A nonlinear amplifier comprising: a current-conductive device composed of at least a cathode, an anode, a control electrode, and a pair of deflection electrodes, for nonlinearly amplifying an input signal when said input signal is coupled jointly to said control electrode and a given one of said deflecting electrodes, said remaining deflection electrode being directly coupled to a source of fixed potential; and means, jointly coupled to said control electrode and said given deflection electrode, for supplying a single source of input signals to be nonlinearly amplified.

2. A nonlinear amplifier comprising: a current-conductive device composed of at least a cathode, an anode, a control electrode, and a pair of deflection electrodes for deflecting current to or away from said anode, for nonlinearly amplifying an input signal when said input signal is coupled jointly to said control electrode and a given one of said deflection electrodes, said remaining deflection electrode being directly coupled to a source of fixed potential; and means, jointly coupled to said control electrode and said given deflection electrode, for supplying a single source of input signals to be nonlinearly amplified.

3. A nonlinear amplifier comprising: a beam deflection tube composed of at least a cathode, an anode, a control electrode, and a pair of deflection electrodes, for nonlinearly amplifying an input signal when said input signal is coupled jointly to said control electrode and a given one of said deflection electrodes, said remaining deflection electrode being directly coupled to a source of fixed potential; and means, jointly coupled to said control electrode and said given deflection electrode, for supplying a single source of input signals to be nonlinearly amplified.

4. A nonlinear amplifier comprising: a current-conductive device composed of at least a cathode, an output anode, a control electrode, and a pair of deflection electrodes for deflecting current to or away from said output anode, for nonlinearly amplifying an input signal when said input signal is coupled jointly to said control electrode and a given one of said deflection electrodes, said remaining deflection electrode being directly coupled to a source of fixed potential; and means, jointly coupled to said control electrode and said given deflection electrode, for supplying a single source of input signals to be nonlinearly amplified.

5. A nonlinear amplifier comprising: a beam deflection tube composed of a cathode, a pair of anodes, a control electrode, and a pair of deflection electrodes for deflecting current to or away from said anodes, for nonlinearly amplifying an input signal when said input signal is coupled jointly to said control electrode and a given one of said deflection electrodes, said remaining deflection electrode being directly coupled to a source of fixed potential; and means, directly coupled to said control electrode and said given deflection electrode, for supplying a single source of input signals to be nonlinearly amplified.

6. A nonlinear amplifier comprising: a current-conductive device composed of at least a cathode, an anode, a control electrode, and a pair of deflection electrodes, for nonlinearly amplifying an input signal when said input signal is coupled jointly to said control electrode and a given one of said deflection electrodes, said remaining deflection electrode being directly coupled to a source of ground potential; and means, jointly coupled to said control electrode and said given deflection electrode, for supplying a single source of input signals to be nonlinearly amplified.

7. A nonlinear amplifier comprising: a beam deflection tube composed of a cathode, a pair of anodes, a control electrode, and a pair of deflection electrodes for deflecting current to or away from said anodes, for nonlinearly amplifying an input signal when said input signal is directly coupled to said control electrode and a given one of said deflection electrodes, said remaining deflection electrode being directly coupled to a source of ground potential; and means, directly coupled to said control electrode and said given deflection electrode, for supplying a single source of input signals to be nonlinearly amplified.

References Cited in the file of this patent

UNITED STATES PATENTS

| | | |
|---|---|---|
| 2,462,860 | Grieg | Mar. 1, 1949 |
| 2,473,754 | Jonker et al. | June 21, 1949 |
| 2,832,847 | Goldstine | Apr. 29, 1958 |
| 3,017,576 | White | Jan. 16, 1962 |